United States Patent [19]

Dang Vu et al.

[11] Patent Number: 5,035,867
[45] Date of Patent: Jul. 30, 1991

[54] REACTOR AND REACTION METHOD WITH INTERNAL HEAT CONTROL BY HOLLOW HEAT EXCHANGER PLATES

[75] Inventors: Quang Dang Vu, Neuilly; Roland Huin, Montesson Labore; Jean-Paul Euzen, Dardilly, all of France

[73] Assignee: Institut Francais du Petrole, Rueil-Malmaison, France

[21] Appl. No.: 296,179

[22] Filed: Jan. 12, 1989

[30] Foreign Application Priority Data

Jan. 13, 1988 [FR] France ................................ 88 00340

[51] Int. Cl.$^5$ ........................... B01J 8/02; F28D 9/00
[52] U.S. Cl. ..................................... 422/200; 422/198; 422/211; 165/157; 165/177; 165/178
[58] Field of Search ................ 165/86, 92, 109.1, 157, 165/177, 178; 422/135, 138, 198, 200, 211; 366/147

[56] References Cited

U.S. PATENT DOCUMENTS

| | | | |
|---|---|---|---|
| 1,841,557 | 3/1930 | Storms | 165/157 X |
| 2,460,987 | 2/1949 | Kanhofer | 422/200 |
| 3,893,811 | 7/1975 | Good et al. | 422/135 X |
| 3,927,987 | 12/1975 | Winter et al. | 422/218 X |
| 4,310,960 | 1/1982 | Parker . | |
| 4,522,502 | 6/1985 | Brazelton | 422/135 X |
| 4,544,544 | 10/1985 | Dang Vu et al. . | |

FOREIGN PATENT DOCUMENTS 2145900 11/1972 Fed. Rep. of Germany ...... 366/147
3168225 12/1987 Fed. Rep. of Germany .

OTHER PUBLICATIONS

"Unit Operations of Chemical Engineering", McCabe, W. L. et al., 4th ed., (1985), pp. 215–217.

*Primary Examiner*—David L. Lacey
*Assistant Examiner*—Jeffrey R. Snay
*Attorney, Agent, or Firm*—Millen, White & Zelano

[57] ABSTRACT

The invention relates to an apparatus for carrying out chemical reactions in the presence of at least one catalyst, in at least one reaction zone equipped with heat exchanger plates allowing the temperature of the zone to be controlled. The apparatus mainly comprises a reactor (1), at least one central distributing manifold (6.1a), a plurality of distributing manifolds (6.2a), at least one central receiving manifold (6.5a), a plurality of receiving manifolds (6.4a), a plurality of connecting manifolds (6.6a) and a plurality of hollow, continuous, elongate plates (6.3a), each divided into two hollow half panels (6.3, 1a and 6.3, 2a). The plates are preferably substantially parallelepipedic and may contain adjacent channels having one of the following forms: square, rectangular, triangular, or sinusoidal.

26 Claims, 2 Drawing Sheets

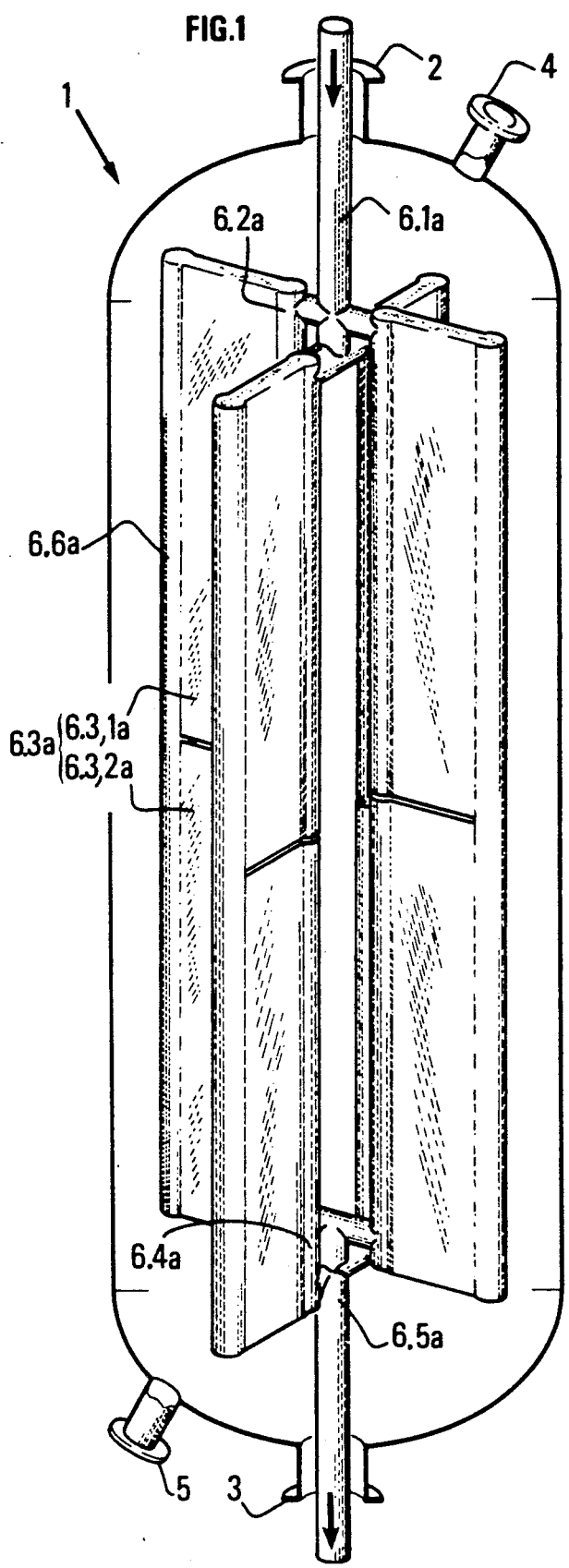
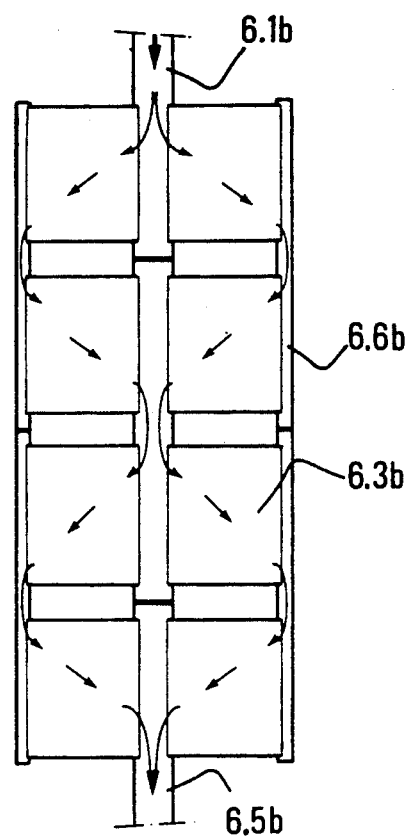

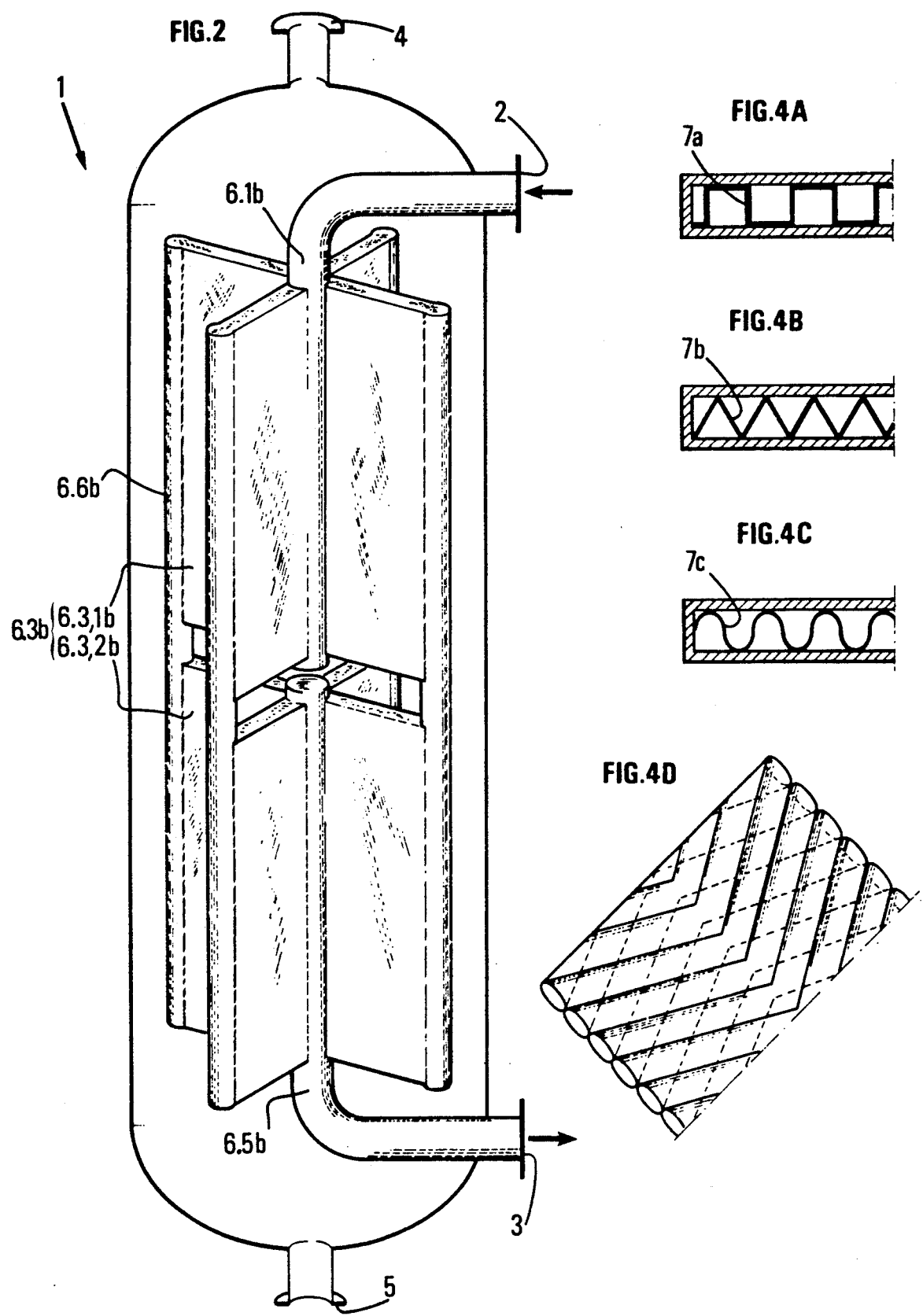

REACTOR AND REACTION METHOD WITH INTERNAL HEAT CONTROL BY HOLLOW HEAT EXCHANGER PLATES

BACKGROUND OF THE INVENTION

The present invention relates to an apparatus, often used under pressure, for carrying out chemical, endothermic or exothermic reactions, generally in the presence of at least one catalyst, e.g. solid, in at least one reaction zone equipped with heat exchanger plates which make it possible to control the temperature of this reaction zone.

When the temperature of the reaction must be kept within relatively narrow limits, it is known to place in heat transfer apparatus in the catalytic bed, either based on tubes (GB-B-2 046 618), or based on plates (U.S. Pat. No. 3,666,423) or based on grids (U.S. Pat. No. 4,693,807), and to cause a fluid to flow inside this apparatus for transferring heat the fluid generally being designated as heat-carrying fluid.

The drawback in the use of a tube heat transfer apparatus is due to the fact that the connection between the individual tubes is very cumbersome and consequently it is very difficult to fit the assembly correctly inside the reactor. The drawback of the plate heat transfer apparatus of the patent U.S. Pat. No. 3,666,423 is its size and its low efficiency. To withstand the reaction pressure, the plates are only partially hollowed out and the heat-carrying fluid thus has only a small portion of the area of the plates for carrying out its exchange work.

The present invention overcomes these drawbacks. The plates used in the invention work under very little stress which makes it possible to hollow them out completely and to let the heat-carrying fluid provide the exchange through the whole of the available surface. In addition, fittings and connections are sufficiently simple to be carried out readily in the restricted space occupied by the reactor.

BRIEF DESCRIPTION OF THE DRAWINGS

The apparatus of the invention is of two types:
FIG. 1 corresponds to the first type of apparatus,
FIGS. 2 and 3 correspond to the second type of apparatus. In these figures, the plates are shown as having flat faces (which corresponds to preferred embodiments of the invention) so as not to overload the figures.
FIGS. 4a, 4b, 4c and 4d show plates in accordance with different improvements of the invention.

DESCRIPTION OF THE PREFERRED EMBODIMENTS

The two types of apparatus comprise a reactor 1 of substantially cylindrical shape whose section has a substantially circular form, at least one duct 2 for introducing a heat-carrying fluid, at least one duct 3 for withdrawing said fluid, at least one duct 4 for introducing a charge into the reactor and at least one duct 5 for removing the reaction effluent from the reactor.

The apparatus of the first type is characterized in that it comprises (see FIG. 1):

a) at least one central distributing manifold 6.1a, e.g. vertical, whose axis corresponds to the axis of the reactor, which is situated in the upper part of the reactor and is connected to duct 2, b) a plurality of distributing manifolds 6.2a parallel to the axis of the reactor, these manifolds being connected individually, towards their top, to the central distributing manifold 6.1a, (c) at least one central receiving manifold 6.5a, e.g. vertical, whose axis corresponds to the axis of the reactor, which is situated in the lower part of the reactor and is connected to duct 3, (d) a plurality of receiving manifolds 6.4a parallel to the axis of the reactor, these manifolds being, on the one hand, connected individually towards their base to the central receiving manifold 6.5a and, on the other hand, situated each in the extension of a corresponding distributing manifold 6.2a, the contact surface between a receiving manifold 6.4a and its corresponding distributing manifold 6.2a being sealed, (e) a plurality of connecting manifolds 6.6a, each of them being, on the one hand, parallel to the axis of the reactor, to a distributing manifold 6.2a and to the corresponding receiving manifold 6.4a and, on the other hand, situated in the same plane defined by this distributing manifold 6.2a, this receiving manifold 6.4a and the axis of the reactor, (f) a plurality of continuous, elongate hollow plates 6.3a intended for flow of the heat-carrying fluid, each plate being divided, widthways, into two hollow half-panels 6.3, 1a and 6.3, 2a, the contact surface between these two half-panels being sealed; the two half-panels are open on to a connecting manifold 6.6a which causes the two half-panels 6.3, 1a and 6.3, 2a to communicate together, the upper half-panel 6.3, 1a being open on to a distributing manifold 6.2a, the lower half-panel 6.3, 2a being open on to the corresponding receiving manifold 6.4a.

In an improvement of the invention, the faces of said hollow plates are formed by corrugated metal sheets whose corrugations are chosen from one of the following forms: square, rectangular, triangular, sinusoidal and herring bone pattern (see FIG. 4d), the aim being to create a high turbulence in the flow of the heat-carrying fluid.

In a preferred embodiment of the apparatus of the first type, the hollow plates are substantially parallelepipedic 6.3a. Each plate comprises two wide parallel faces defining a plane disposed radially with respect to the axis of the reactor and four thin faces, two of them being parallel to the axis of the reactor, the other two being perpendicular to this axis. In addition, each plate is divided, widthways, into two hollow half-panels 6.3, 1a and 6.3, 2a, the contact surface between these two half-panels being sealed. These two half-panels are open, over the whole of their thin face parallel to the axis of the reactor and the furthest away from this axis, on to a connecting manifold 6.6a which causes the two half-panels 6.3, 1a and 6.3, 2a to communicate with each other. The upper half-panel 6.3, 1a is open, over the whole of its thin face parallel to the axis of the reactor and the closest to this axis, on to a distributing manifold 6.2a. The lower half-panel 6.3, 2a is open, over the whole of its thin face parallel to the axis of the reactor and the closest to this axis, on to the corresponding receiving manifold 6.4a. The thin faces of each hollow plate may possibly be semicylindrical as opposed to flat.

In FIG. 1, given by way of example, the path of the heat-carrying fluid through the substantially parallelepipedic hollow plates will be described.

The charge enters reactor 1 through duct 4, passes through the catalytic bed contained in the reactor, then leaves the reactor through the duct 5. The heat-carrying fluid, for example autogenous (i.e. formed by one or more components forming either the fresh charge or the reaction effluent) passes from duct 2 into the central distributing manifold 6.1a. The fluid is then divided out between the distributing manifolds 6.2a. Then the fluid penetrates into each of the upper hollow half-panels 6.3, 1a through their thin face parallel to the axis of the reactor and the closest to this axis, these half-panels being disposed in the catalytic bed contained in the reactor 1. The fluid moves down inside the upper half-panels in the form of a sheet. On leaving each upper half-panel the fluid is collected in a connecting manifold 6.6a which causes each of the upper half-panels 6.3, 1a to communicate with a lower half-panel 6.3, 2a situated in its extension. The fluid then penetrates into each of the lower hollow half-panels 6.3, 2a through their thin face parallel to the axis of the reactor and the furthest away from this axis, these half-panels also being disposed within the catalytic bed contained in the reactor 1. The fluid then moves down inside the lower half-panels in the form of a sheet. On leaving each lower half-panel, the fluid is collected in a receiving manifold 6.4a which is connected to the central receiving manifold 6.15a into which the fluid then passes. Finally, the fluid leaves the reactor 1 through duct 3.

The apparatus of the second type is characterized in that it comprises (see FIG. 2):

a) at least one central distributing manifold 6.1b, e.g. vertical, whose axis corresponds to the axis of the reactor, which is situated above a central receiving manifold 6.5b defined below and is connected to duct 2, b) a plurality of connecting manifolds 6.6b parallel to the axis of the reactor, c) at least one central receiving manifold 6.5b, e.g. vertical, whose axis corresponds to the axis of the reactor, which is situated below the central distributing manifold 6.1b and is connected to the duct 3, d) a plurality of continuous, elongate, hollow plates 6.3b intended for the flow of heat-carrying fluid, said plates being associated two by two, each association comprising two series of plates; a first series of plates 6.3, 1b is situated above the second series, each of the plates of this first series 6.3, 1b being open on to a connecting manifold 6.6b and on to the central distributing manifold 6.1b; a second series of plates 6.3, 2b is situated below the first series of plates 6.3, 1b, each of the plates of this second series 6.3, 2b being situated in the extension of a plate of the first series 6.3, 1b (the plates of the first series not being adjacent those of the second series), and being open on to a connecting manifold 6.6b which causes each plate of this second series to communicate with a plate of the first series situated in its extension, and being open on to the central receiving manifold 6.5b.

In an improvement of the invention, the faces of said hollow plates are formed by corrugated metal sheets whose corrugations are chosen from one of the following forms: square, rectangular, triangular, sinusoidal or herring bone pattern (see FIG. 4d). The aim is to create, as in the apparatus of the first type, a high turbulence in the flow of the heat-carrying fluid.

In a preferred embodiment of the apparatus of the second type, the hollow plates are substantially parallelepipedic. Each plate comprises two wide parallel faces defining a plane disposed radially with respect to the axis of the reactor and four thin faces, two of them being parallel to the axis of the reactor, the other two being perpendicular to this axis. In addition, said plates are associated two by two, each association comprising two series of plates: a first series of plates 6.3, 1b is situated above a second series, each of the plates of this first series 6.3, 1b being open, over the whole of its thin face parallel to the axis of the reactor and the furthest away from this axis, on to a connecting manifold 6.6b and open, over the whole of its thin face parallel to the axis of the reactor and the closest to this axis, on to the central distributing manifold 6.1b; a second series of plates 6.3, 2b is situated below the first series of plates 6.3, 1b, each of the plates of this second series 6.3, 2b being situated in the extension of a plate of the first series 6.3, 1b (the plates of the first series not being adjacent those of the second series), being open, over the whole of its thin face parallel to the axis of the reactor and the furthest away from this axis on to a connecting manifold 6.6b which causes each plate of this second series to communicate with a plate of the first series situated in its extension, and being open, over the whole of its thin face parallel to the axis of the reactor and the closest to this axis, on to the central receiving manifold 6.5b. The thin faces of each hollow plate may, possibly, be not flat, but, for example, can be semi-cylindrical.

In FIG. 2, given by way of example, the path of the heat-carrying fluid through the substantially parallelepipedic hollow plates will be described: the charge enters reactor 1 through duct 4, passes through the catalytic bed contained in the reactor, then leaves said reactor through the duct 5. The heat-carrying fluid, for example, autogenous (i.e. formed by one or more components forming either the fresh charge or the reaction effluent) passes from duct 2 into the central distributing manifold 6.1b. Then the fluid penetrates into each of the hollow plates of the first series 6.3, 1b through their thin face parallel to the axis of the reactor and the closest to this axis, these plates being disposed in the catalytic bed contained in the reactor 1. The fluid moves down inside each plate of the first series in the form of a sheet. On leaving each plate of the first series, the fluid is collected in a connecting manifold 6.6b which causes each plate of the first series 6.3, 1b to communicate with a plate of the second series 6.3, 2b situated in its extension. The fluid then penetrates into each of the hollow plates of the second series through their thin face parallel to the axis of the reactor and the furthest away from this axis, these plates also being disposed within the catalytic bed contained in the reactor 1. The fluid then moves down inside each plate of the second series in the form of a sheet. On leaving each plate of the second series, the fluid is collected in the central receiving manifold 6.5b. Finally, the fluid leaves the reactor 1 through duct 3.

In an improvement of the invention, the apparatus of the second type may contain several associations of two series of plates, the associations being stacked along the axis of the reactor (see FIG. 3). In FIG. 3, two associations of two series of plates each have been shown arbitrarily, but the number of such associations may be higher. In FIG. 3, the fluid follows the path shown by the arrows F, and flows through two associations of two series of plates. This fluid thus travels twice the path described in FIG. 2. When the number of associations of two series of plates is equal to n, with n greater than 2, then the fluid travels successively n times the path described in FIG. 2.

In the two types of apparatus, the presence of plates through which a fluid flows makes it possible to heat or cool permanently a charge (separated or not from the fluid) treated in the reactor.

In a variant of the invention, the hollow plates may if required have different widths, which makes it possible to maintain a minimum ratio between the reactor volume and the exchange surface, while avoiding too great a distance between any point of the reactor and the nearest plate.

The fluid may be conveyed, for example, by drawing off by means of a pump (not shown in the figures) placed at the outlet of the reactor 1. Generally, at least one of the components forming the charge is either in the liquid state, or in a state making flow thereof possible by means of a pump (supercritical state).

It should be noted (see FIGS. 4a, 4b and 4c) that, in each of the substantially parallelepipedic hollow plates, adjacent channels may be formed by means of corrugated metal sheets, the sections of the channels having one of the following shapes: square, rectangular 7a, triangular 7b or sinusoidal 7c. These channels connect together the two thin faces parallel to the axis of the reactor of the same plate. On the one hand, the presence of these adjacent channels ensures the strength of the hollow plates which may reach and exceed, for example, ten meters in height and, on the other hand, it avoids the formation of dead zones (i.e. zones through which the fluid does not flow), which dead zones could be formed because of the sheet-like flow of the heat-carrying fluid inside the plates.

The metal sheets may be assembled together either by welding, or much more economically by brazing or by points, or by immersion in a bath, or any other adequate technique.

The metal sheets possibly used in the different embodiments of the invention are generally less than 10 mm thick, preferably less than 3 mm thick.

In an improvement of the invention, the duct 3 for drawing off the heat-carrying fluid and duct 5 for drawing off the reaction effluent open into the same chamber (not shown). This chamber is formed either inside or outside the reactor 1 and comprises another duct through which the heat-carrying fluid-reaction effluent mixture is withdrawn. This improvement is particularly used in the case of an autogenous heat-carrying fluid, e.g. formed from the reaction effluent. The heat-carrying fluid and the reaction effluent are, at the outlet of reactor 1, mixed in the chamber from which they leave together through the drawing off duct. The reaction effluent is then fed to subsequent conditioning (not shown) while the heat-carrying fluid, after suitable thermal re-adjustment, is fed into duct 2.

In another improvement of the invention, the ducts 2 and 4 come from the same mixing chamber where the fresh reaction charge and the heat-carrying fluid coming from duct 3 are brought. In this case, the heat-carrying fluid is autogenous and formed for example from the fresh charge.

The advantage of an autogenous heat-carrying fluid is, on the one hand, that there is no pressure difference between the inside and the outside of the plates (apart from that created by the pressure losses due to flow of the fluids) and, on the other hand, that in the case of a leak there is no danger of pollution of the catalytic system.

In another preferred embodiment of the invention, the central distributing manifold, the central receiving manifold, the receiving manifolds, the distributing manifolds and the connecting manifolds may have circular sections so as to make the hollow plates more rigid.

In FIGS. 1, 2 and 3, the apparatus is shown in a substantially vertical position. The flow of the heat-carrying fluid and of the charge may take place from top to bottom, as described above, or from bottom to top. Similarly, the apparatus may be used in a substantially slanted position or in a substantially horizontal position: this is for example the case where, with a very long reactor, there is a substantial difference of the static pressure between the top and bottom of the reactor.

In addition, in FIGS. 1, 2 and 3, the charge intake duct 4 has been shown arbitrarily at the top of reactor 1 and the reaction effluent removal duct 5 at the base of the reactor 1. However, these ducts 4 and 5 may in fact be situated at any adequate level of the reactor.

Each of FIGS. 1, 2 and 3 shows an axial reactor in which the reagents pass through the catalytic bed parallel to the axis of the reactor.

The invention also applies to a radial reactor having a permeable basket in the form of a cylindrical ring, for example defined by two coaxial cylinders, in which the catalyst and the hollow plates are disposed and where the reagents pass through the bed perpendicularly to the axis of the reactor.

The apparatus of the invention may be used in endothermic or exothermic hydrocarbon treatment processes.

What is claimed is:

1. An apparatus comprising a substantially cylindrical reactor (1) having a substantially circular cross section, said reactor also having an upper part, a lower part, and a central axis, and said reactor being in fluid communication with a first duct (2) for introduction of heat-carrying fluid, at least one duct (4) for introduction of a charge into said reactor, a second duct (3) for removal of heat-carrying fluid, and at least one duct (5) for removal of reaction effluent from said reactor, said apparatus further comprising:

a) a central distributing manifold (6.1a), having a longitudinal axis corresponding to said axis of said reactor, which is situated in the upper part of said reactor and is in fluid communication with said first duct (2) for introduction of heat-carrying fluid;

b) a plurality of distributing manifolds (6.2a), each having a longitudinal axis parallel to said axis of said reactor, said distributing manifolds being individually in fluid communication, towards their top, with said central distributing manifold (6.1a);

c) a central receiving manifold (6.5a) having a longitudinal axis corresponding to said axis of said reactor, which is situated in said lower part of said reactor and is in fluid communication with said second duct (3) for removal of heat-carrying fluid;

d) a plurality of receiving manifolds (6.4a), each having a longitudinal axis parallel to said axis of said reactor, said receiving manifolds being individually in fluid communication, towards their base, with said central receiving manifold (6.5a) and each of said receiving manifolds being positioned substantially along the same axis of a corresponding one of said plurality of distributing manifolds (6.2a), a sealed contact surface existing between each receiving manifold (6.4a) and its corresponding one of said plurality of distributing manifolds (6.2a);

e) a plurality of connecting manifolds (6.6a), each of said connecting manifolds being parallel to the axes of said reactor, one of said plurality of receiving manifolds (6.4a), and a corresponding one of said plurality of distributing manifolds (6.2a), each of said connecting manifolds being situated in a plane defined by said axes of said reactor, said one of said plurality of receiving manifolds (6.4a), and said corresponding one of said plurality of distributing manifolds (6.2a);

f) a plurality of continuous, elongated, substantially parallelepipedic, hollow plates (6.3a) suitable for flow of heat-carrying fluid, each of said plates being divided, widthways, into a pair of half-panels (6.3, 1a; 6.3, 2a), a sealed contact surface existing between said half-panels of said pair, each of said half-panels of said pair being in fluid communication with one of said plurality of connecting manifolds (6.6a) thereby placing each of said half-panels of each of said hollow plates in fluid communication with the other half-panel of said pair, one of said half-panels of said pair (6.3, 1a) being in fluid communication with one of said plurality of distributing manifolds (6.2a) and other half-panel of said pair (6.3, 2a) being in fluid communication with said corresponding one of said plurality of receiving manifolds (6.4a).

2. An apparatus according to claim 1, wherein said plurality of hollow plates are disposed within a catalyst bed contained in said reactor.

3. An apparatus according to claim 1, wherein said plurality of hollow plates are positioned so as to be stationary within said reactor.

4. Apparatus according to claim 1, wherein said reactor contains a catalyst.

5. Apparatus according to claim 4, wherein said catalyst is solid.

6. An apparatus according to claim 1, wherein said hollow plates are formed by corrugated metal sheets whose corrugations are selected from the group of shapes consisting of: rectangular, triangular, sinusoidal and herring bone pattern.

7. An apparatus according to claim 6, wherein said corrugated metal sheets are less than 10 mm thick.

8. An apparatus according to claim 6, wherein said corrugated metal sheets are less than 3 mm thick.

9. An apparatus according to claim 6, wherein each central distributing manifold (6.1a), each central receiving manifold (6.5a), each distributing manifold (6.2a) each receiving manifold (6.4a) and each connecting manifold (6.6a) have a circular cross section.

10. An apparatus according to claim 6, wherein said corrugation is of a rectangular shape.

11. An apparatus according to claim 1, wherein each of said hollow plates comprises two wide parallel faces, defining a plane disposed radially with respect to said axis of said reactor, and four thin faces, two of said four thin faces being parallel to said axis of said reactor and the other two of said four thin faces being perpendicular to said axis of said reactor, said pair of half-panels of each of said hollow plates being in fluid communication, over the whole of their thin face which is parallel to said axis of said reactor and is furthest away from said axis of said reactor, with a connecting manifold (6.6a), thereby placing said half-panels of said pair (6.3, 1a) and 6.3, 2a) in fluid communication with each other, one of said half-panels (6.3, 1a) being in fluid communication, over the whole of its thin face which is parallel to said axis of said reactor and is closest to said axis of said reactor, with one of said distributing manifolds (6.2a) and the other half-panel (6.3, 2a) being in fluid communication, over the whole of its thin face which is parallel to said axis of said reactor and is closest to said axis of said reactor, with a corresponding one of said plurality of receiving manifolds (6.4a).

12. An apparatus according to claim 11, wherein adjacent channels are formed in each of said hollow plates by corrugated metal sheets, said channels connecting together said two thin faces parallel to said axis of said reactor of each of said plates, the sections of said channels being selected from the group of shapes consisting of: rectangular, triangular and sinusoidal.

13. An apparatus according to claim 12, wherein cross sections of said channels are of a rectangular shape.

14. An apparatus comprising a substantially cylindrical reactor (1) having a substantially circular cross section and a central axis and said reactor being in fluid communication with a first duct (2) for introduction of heat-carrying fluid, a second duct (3) for removal of heat-carrying fluid, at least one duct (4) for introduction of a charge into said reactor and at least one duct (5) for removal of reaction affluent from said reactor, said apparatus further comprising:

a) a central distributing manifold (6.1b) having a longitudinal axis corresponding to said axis of said reactor, and which is in fluid communication with said first duct (2) for introduction of heat-carrying fluid;

b) a plurality of connecting manifolds (6.6b) parallel to said axis of said reactor;

c) a central receiving manifold (6.5b) having a longitudinal axis corresponding to said axis of said reactor, and which is in fluid communication with said second duct (3) for removal of heat-carrying fluid;

d) a first plurality of hollow plates for providing flow of said heat-carrying fluid, each of said first plurality of hollow plates being in fluid communication with said central distributing manifold; and e) a second plurality of hollow plates for providing flow of said heat-carrying fluid, each of said second plurality of hollow plates being in fluid communication with said central receiving manifold, each of said second plurality of hollow plates further being disposed below and substantially parallel with a corresponding one of said first plurality of hollow plates;

wherein each of said plurality of connecting manifolds are in fluid communication with one of said second plurality of hollow plates and said corresponding one of said first plurality of hollow plates, each of said first plurality of plates radially extending from said central distributing manifold to one of said connecting manifolds, each of said second plurality of plates extending from said central receiving manifold to one of said connecting manifolds.

15. An apparatus according to claim 14, wherein each central distributing manifold (6.1b), each central receiving manifold (6.5b), and each connecting manifold (6.6b) have a circular cross section.

16. An apparatus according to claim 14, wherein said first and second pluralities hollow plates are disposed within a catalyst bed contained in said reactor.

17. An apparatus according to claim 14, wherein said plurality of hollow plates are positioned so as to be stationary within said reactor.

18. An apparatus according to claim 14, wherein the faces of said hollow plates are substantially formed by corrugated metal sheets whose corrugations are selected from the group of shapes consisting of: rectangular, triangular, sinusoidal and herring bone pattern.

19. An apparatus according to claim 18, wherein said corrugated metal sheets are less than 10 mm thick.

20. Apparatus according to claim 18, wherein said corrugated metal sheets are less than 3 mm thick.

21. An apparatus according to claim 18, wherein said corrugations are of a rectangular shape.

22. An apparatus according to claim 14, wherein each of said hollow plates comprises two parallel faces, defining a plane disposed radially with respect to said axis of said reactor, and four thin faces, two of said four thin faces being parallel to said axis of said reactor, the other two of said four faces being perpendicular to said axis of said reactor, each of said plates of said first plurality of hollow plates (6.3, 1b) being in fluid communication, over the whole of its thin face which is parallel to said axis of said reactor and is furthest away from said axis of said reactor, with a connecting manifold (6.6b) and being in fluid communication, over the whole of its thin face which is parallel to said axis of said reactor and is closest to said axis of said reactor, with said central distributing manifold (6.1b), each of said plates of said second plurality of hollow plates (6.3, 2b) being in fluid communication, over the whole of its thin face which is parallel to said axis of said reactor and is furthest away from said axis of said reactor, with one of said connecting manifolds (6.6b) thereby placing each plate of said second plurality of hollow plates in fluid communication with a corresponding plate of said first plurality of hollow plates, each plate of said second plurality of hollow plates also being in fluid communication, over the whole of its thin face which is parallel to said axis of said reactor and is closest to said axis of said reactor, with said central receiving manifold (6.5b).

23. An apparatus according to claim 22, wherein adjacent channels are formed in each of said hollow plates by corrugated metal sheets, said channels connecting together said two thin faces parallel to said axis of said reactor of each of said plate, the sections of said channels being selected from the group of shapes consisting of: square, rectangular, triangular and sinusoidal.

24. An apparatus according to claim 23, wherein cross sections of said channels are of a rectangular shape.

25. An apparatus comprising a substantially cylindrical reactor having a substantially circular cross section, a central axis, a first duct for introduction of heat-carrying fluid, a second duct for removal of heat-carrying fluid, at least one duct for introduction of a reactor charge, and at least one duct for removal of a reaction effluent, said apparatus further comprising:
a) a central distributing manifold having a longitudinal axis, said longitudinal axis of said central distributing manifold being disposed along said axis of said reactor, said central distributing manifold being in fluid communication with said first duct;
b) a plurality of connecting manifolds, each one of said plurality of connecting manifolds being parallel to said axis of said reactor;
c) a central receiving manifold having a longitudinal axis, said longitudinal axis of said central receiving manifold being disposed along said axis of said reactor, said central receiving manifold being in fluid communication with said second duct;
d) a first plurality of hollow plates for providing flow of heat-carrying fluid, each of said first plurality of hollow plates being in fluid communication with said central distributing manifold; and
e) a second plurality of hollow plates for providing flow of heat-carrying fluid, each of said second plurality of hollow plates being in fluid communication with said central receiving manifold, each of said second plurality of hollow plates further being disposed below and substantially parallel with a corresponding one of said first plurality of hollow plates;
wherein each of said plurality of connecting manifolds is in fluid communication with one of said second plurality of hollow plates and with said corresponding one of said first plurality of hollow plates; and
further wherein said first and second pluralities of hollow plates, said plurality of connecting manifolds, said central distributing manifold, and said central receiving manifold form an association, said apparatus further comprising a plurality of said associations, said associations being stacked along said axis of said reactor, said central receiving manifold of each of said plurality of associations being in fluid communication with the central distributing manifold of an adjacent one of said plurality of associations.

26. In a heat transfer process wherein said process is conducted in a reactor comprising a catalyst bed and means for heat transfer, the improvement comprising:
said process being conducted in a substantially cylindrical reactor (1) having a substantially circular cross section, said reactor also having an upper part, a lower part, and a central axis, and said reactor being in fluid communication with a first duct (2) for introduction of heat-carrying fluid, at least one duct (4) for introduction of a charge into said reactor, a second duct (3) for removal of heat-carrying fluid, and at least one duct (5) for removal of reaction effluent from said reactor, said apparatus further comprising:
a) a central distributing manifold (6.1a), having a longitudinal axis corresponding to said axis of said reactor, which is situated in the upper part of said reactor and is in fluid communication with said first duct (2) for introduction of heat-carrying fluid;
b) a plurality of distributing manifolds (6.2a), each having a longitudinal axis parallel to said axis of said reactor, said distributing manifolds being individually in fluid communication, towards their top, with said central distributing manifold (6.1a);
c) a central receiving manifold (6.5a) having a longitudinal axis corresponding to said axis of said reactor, which is situated in said lower part of said reactor and is in fluid communication with said second duct (3) for removal of heat-carrying fluid;
d) a plurality of receiving manifolds (6.4a), each having a longitudinal axis parallel to said axis of said reactor, said receiving manifolds being individually in fluid communication, towards their base, with said central receiving manifold (6.5a) and each of said receiving manifolds being positioned substantially along the same axis of a corresponding one of said plurality of distributing manifolds (6.2a), a sealed contact surface existing between each receiving manifold (6.4a) and its corresponding one of said plurality of distributing manifolds (6.2a);
e) a plurality of connecting manifolds (6.6a), each of said connecting manifolds being parallel to the axes of said reactor, one of said plurality of receiving manifolds (6.4a), and a corresponding one of said plurality of distributing manifolds (6.2a), each of said connecting manifolds being situated in a plane defined by said axes of said reactor, said one of said plurality of receiving manifolds (6.4a), and said corresponding one of said plurality of distributing manifolds (6.2a);

f) a plurality of continuous, elongated, substantially parallelepipedic, hollow plates (6.3a) suitable for flow of heat-carrying fluid, each of said plates being divided, widthways, into a pair of half-panels (6.3, 1a; 6.3, 2a), a sealed contact surface existing between said half-panels of said pair, each of said half-panels of said pair being in fluid communication with one of said plurality of connecting manifolds (6.6a) thereby placing each of said half-panels of each of said hollow plates in fluid communication with the other half-panel of said pair, one of said half-panels of said pair (6.3, 1a) being in fluid communication with one of said plurality of distributing manifolds (6.2a) and other half-panel of said pair (6.3, 2a) being in fluid communication with said corresponding one of said plurality of receiving manifolds (6.4a) wherein said reactor contains a catalyst, and wherein a heat-carrying fluid is introduced into said reactor via said first duct for the introduction of heat-carrying fluid, said heat-carrying fluid is removed from said reactor via said second duct for the removal of heat-carrying fluid, a fluid charge is introduced into said reactor via said at least one duct for the introduction of a charge, and reactor effluent is removed from said reactor via said at least one duct for removal of reaction effluent.

* * * * *